(12) United States Patent
Bunn et al.

(10) Patent No.: US 9,503,479 B2
(45) Date of Patent: *Nov. 22, 2016

(54) ASSESSMENT OF NETWORK PERIMETER SECURITY

(71) Applicant: International Business Machines Corporation, Armonk, NY (US)

(72) Inventors: W. Carey Bunn, Longmont, CO (US);
Letitia K. Calvert, Erie, CO (US);
Mary E. Karnes, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,095

(22) Filed: Mar. 23, 2015

(65) Prior Publication Data

US 2015/0195308 A1 Jul. 9, 2015

Related U.S. Application Data

(63) Continuation of application No. 14/026,706, filed on Sep. 13, 2013, now Pat. No. 9,071,646, which is a continuation of application No. 10/743,119, filed on Dec. 22, 2003, now Pat. No. 8,561,154.

(51) Int. Cl.
*H04L 29/06* (2006.01)

(52) U.S. Cl.
CPC ............ *H04L 63/20* (2013.01); *H04L 63/102* (2013.01); *H04L 63/1433* (2013.01)

(58) Field of Classification Search
CPC .. H04L 63/20; H04L 63/102; H04L 63/1433
See application file for complete search history.

(56) References Cited

U.S. PATENT DOCUMENTS

| | | |
|---|---|---|
| 5,892,903 A | 4/1999 | Klaus |
| 6,185,689 B1 | 2/2001 | Todd et al. |
| 6,453,345 B2 | 9/2002 | Trcka et al. |
| 6,484,261 B1 | 11/2002 | Wiegel |
| 6,950,936 B2 | 9/2005 | Subramaniam et al. |
| 6,988,208 B2 | 1/2006 | Hrabik et al. |
| 7,159,237 B2 | 1/2007 | Schneier et al. |
| 7,237,267 B2 | 6/2007 | Rayes et al. |

(Continued)

OTHER PUBLICATIONS

Levine, John, et al. "The use of honeynets to detect exploited systems across large enterprise networks." Information Assurance Workshop, 2003. IEEE Systems, Man and Cybernetics Society. IEEE, 2003. (pp. 92-99).*

(Continued)

*Primary Examiner* — Kari Schmidt
(74) *Attorney, Agent, or Firm* — Schmeiser, Olsen & Watts, LLP; Michael Petrocelli (57) ABSTRACT

A method and system for assessing security of a network perimeter of a network. Security of an authentication computer from attack is reviewed. Users outside of the network perimeter that request access to an application within the network perimeter are authenticated. Vulnerability of a gateway computer at the network perimeter from applications outside of the network perimeter is reviewed. The reviewing of vulnerability of the gateway computer includes scanning ports on the gateway computer to determine whether an unauthorized application outside the network perimeter and/or at least one unauthorized service from the unauthorized application is available within the network perimeter via the gateway computer.

12 Claims, 11 Drawing Sheets

(56) References Cited

U.S. PATENT DOCUMENTS

| | | | |
|---|---|---|---|
| 7,523,499 | B2 | 4/2009 | Wilkins et al. |
| 7,620,974 | B2 | 11/2009 | Newstadt et al. |
| 2002/0026591 | A1 | 2/2002 | Hartley et al. |
| 2002/0147803 | A1 | 10/2002 | Dodd et al. |
| 2003/0028803 | A1 | 2/2003 | Bunker et al. |
| 2003/0033542 | A1* | 2/2003 | Goseva-Popstojanova ..... H04L 63/1433 726/23 |
| 2003/0056116 | A1 | 3/2003 | Bunker et al. |
| 2003/0093696 | A1 | 5/2003 | Sugimoto |
| 2003/0097588 | A1 | 5/2003 | Fischman et al. |
| 2003/0204632 | A1 | 10/2003 | Willebeek-LeMair et al. |
| 2003/0212909 | A1 | 11/2003 | Chandrashekhar et al. |
| 2003/0217039 | A1 | 11/2003 | Kurtz et al. |
| 2003/0229808 | A1 | 12/2003 | Heintz et al. |
| 2004/0015719 | A1 | 1/2004 | Lee et al. |
| 2004/0015728 | A1 | 1/2004 | Cole et al. |
| 2004/0103315 | A1 | 5/2004 | Cooper et al. |
| 2005/0005169 | A1 | 1/2005 | Kelekar |
| 2005/0160286 | A1 | 7/2005 | Currie et al. |
| 2005/0177746 | A1 | 8/2005 | Bunn et al. |
| 2006/0010492 | A9 | 1/2006 | Heintz et al. |

OTHER PUBLICATIONS

Oppliger, Rolf. "Internet security: firewalls and beyond." Communications of the ACM 40.5 (1997): 92-102.*

TCPDump—Tools for Network Analysis, China Academic Journal Electronic Publishing House, Nov. 2000, pp. 54-55 (English Translation—Summary of Article).

Security Risk Evaluation in Computer Network, Tsinghua Tongfang Optical Disc Co. Ltd., vol. 16, 2001, pp. 66-67 (English Translation—Summary of Article).

Zhao, Qing-Song et al., A Study on Network Vulnerability, Tsinghua Tongfang Optical Disc Co. Ltd., vol. 23, No. 9, Sep. 2003, pp. 47-49 (English Translation—Abstract Only).

Shuqin, Li, Constructing of the Security System for Local Area Network, China Academic Journal Electronic Publishing House, 2003, 3 pages (English Translation—Abstract Only).

eSoft "Why Your Network May Not Be as Secure as it Should Be" Retrieved from internet, http://www.kfa-inc.com/techtips/securitywhitepaper.pdf, 2002, 8 pages.

U.S. Appl. No. 10/743,119, Notice of Allowance mailed Jun. 5, 2013.

U.S. Appl. No. 10/743,119, Final Office Action mailed Jul. 6, 2011.

U.S. Appl. No. 10/743,119, Office Action mailed Feb. 2, 2011.

U.S. Appl. No. 10/743,119, Final Office Action mailed Sep. 18, 2007.

U.S. Appl. No. 10/743,119, Office Action mailed Mar. 28, 2007.

U.S. Appl. No. 10/743,119, Advisory Action mailed Dec. 12, 2007.

Cisco System, "Network Security: An Executive Overview" 2001, 6 pages.

U.S. Appl. No. 14/026,706, Notice of Allowance mailed Feb. 20, 2015.

U.S. Appl. No. 14/026,706, Response to Restriction mailed Dec. 22, 2014.

U.S. Appl. No. 14/026,706, Restriction mailed Oct. 22, 2014.

Tony Bradley, Introduction to Port Scanning, retrieved on Jul. 5, 2016 from the Internet: <URL: http://netsecurity.about.com/cs/hackertools/a/aa121303.htm>, 2 pages.

* cited by examiner

ASSESSMENT OF NETWORK PERIMETER SECURITY

CROSS REFERENCE TO RELATED APPLICATION

This application is a continuation application claiming priority to Ser. No. 14/026,706, filed Sep. 13, 2013, now U.S. Pat. No. 9,071,646, issued Jun. 30, 2015, which is a continuation of Ser. No. 10/743,119, filed Dec. 22, 2003, U.S. Pat. No. 8,561,154, issued Oct. 15, 2013.

BACKGROUND

Field of the Invention

This invention relates in general to network security, and more particularly to a method for providing network perimeter security assessment.

Description of Related Art

Computer security and network security are very important today to prevent attacks by others, particularly when the computer and network are connected to the Internet or other untrusted network. These attacks can be in the form of computer viruses, worms, denial of service, improper access to data, etc. There is a standard security model known as CIA, or Confidentiality, Integrity, and Availability. This three tiered model is a generally accepted component to assessing risks to sensitive information and establishing security policy.

The term "computer-readable storage device" does not encompass a signal propagation media such as a copper cable, optical fiber or wireless transmission media.

Confidentiality refers to the fact that sensitive information must be available only to a set of pre-defined individuals. Unauthorized transmission and usage of information should be restricted. For example, confidentiality of information ensures that an unauthorized individual does not obtain a customer's personal or financial information for malicious purposes such as identity theft or credit fraud.

Integrity means that information should not be altered in ways that render it incomplete or incorrect. Unauthorized users should be restricted from the ability to modify or destroy sensitive information.

Availability refers to the concept that information should be accessible to authorized users any time that it is needed. Availability is a warranty that information can be obtained with an agreed-upon frequency and timeliness. This is often measured in terms of percentages and agreed to formally in Service Level Agreements (SLAs) used by network service providers and their enterprise clients.

Traditionally, Internet security has concentrated on setting up a perimeter to keep unauthorized people out. Modern information security requires a focus on enabling business and creating a perimeter that can give customers, suppliers and partners access. There are software tools for security evaluations, hardware tools for protection (firewalls), and consulting services (manual checks). These tools are useful to find technology specific vulnerabilities.

The widely accepted paradigm of the CIA triad discussed above is a basic framework for a secure environment. There are tools that individually provide network security according to the CIA triad; however these tools are generally specific to only one discipline, e.g., analyzing security policies, performing architectural reviews, reviewing components of a system, performing system vulnerability analysis, or performing application reviews. More particularly, manual architecture review processes have been developed for providing a high-level analysis of the security infrastructure, the integration of applications, systems and network infrastructure and the overall system security. However, such approaches are generally focused on specific network component vendor's products and compatible devices rather than providing a broad framework for architectural security review. An example of such an approach is Cisco Systems' SAFE Blueprint for designing and implementing secure networks based on the Cisco Architecture for Voice, Video and Integrated Data (AVVID). Furthermore, there are tools to assist in performing vulnerability reviews. Examples of such tools for providing vulnerability review include Nessus, security products from Internet Security Systems (ISS), Network Security Assessment (NSA), Retina® just to name a few.

There are also tools for providing component review, application review and policy review. Examples of such tools for providing component review include Symantec ESM and Tivoli JAC. Examples of such tools for providing application review include research-based components that might also involve using a protocol analyzer to sniff the wire. Examples of protocol analyzers are ethereal and tcpdump. Policy review includes analyzing and developing company security policies. Examples of such frameworks include company proprietary ones and various government publications such as the National Institute of Standards and Technology (NIST) "Guidelines on Firewalls and Firewall Policy," and the NIST "Security Guide for Interconnecting Information Systems Technology." As mentioned, some of these review tools are proprietary and some open source. Further, there are various published methodologies discussing what is referred to as "defense in depth," which is a way to create a secure network and perimeter.

It can be seen then that there is a need for a method for providing a comprehensive network perimeter security assessment.

SUMMARY OF THE INVENTION

To overcome the limitations in the prior art described above, and to overcome other limitations that will become apparent upon reading and understanding the present specification, the present invention discloses a method for providing a comprehensive network perimeter security assessment.

The present invention solves the above-described problems by providing a combination of elements for providing a security review of a network perimeter. The elements may include network architecture review, component review, application review, policy review and vulnerability review.

A method in accordance with the principles of the present invention includes reviewing security of a network perimeter architecture, reviewing security of data processing devices that transfer data across the perimeter of the network, reviewing security of applications that transfer data across said perimeter and reviewing vulnerability of applications or data processing devices within said perimeter from computers or users outside of said perimeter.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE FIGURES

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for providing a comprehensive network perimeter security assessment. The elements for checking network perimeter security are the backbone for providing a security review of the network perimeter. By providing a method for checking network perimeter security that incorporates more than one network security discipline, an enterprise architecture that is more secure from attacks to computers and network devices may be developed.

Figure 1:
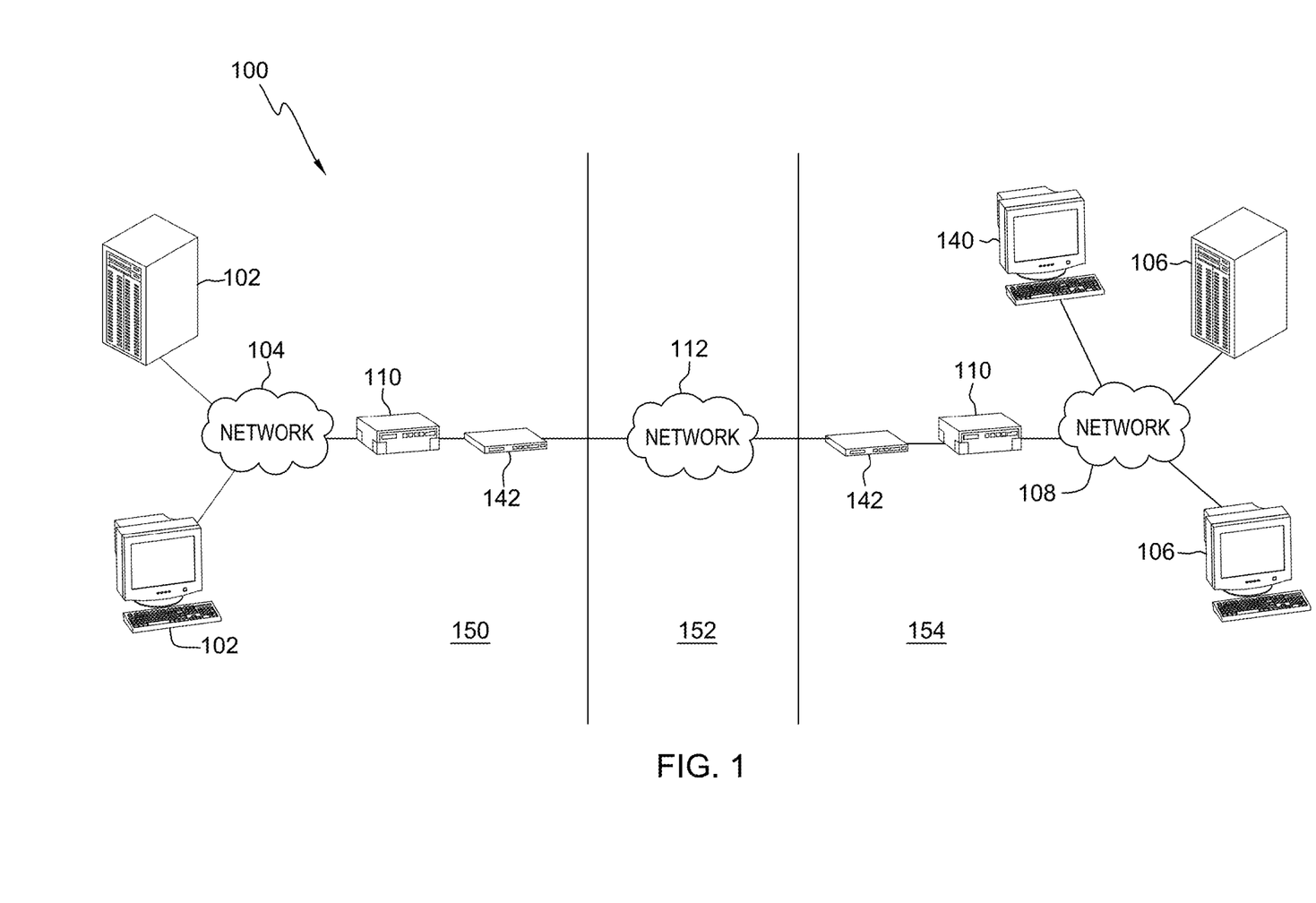
FIG. 1 illustrates a network architecture 100 according to an embodiment of the present invention.

FIG. 1 illustrates network architecture 100 according to an embodiment of the present invention. As shown, a remote source 102 is provided which is coupled to a network 104. Also included is a plurality of devices 106 coupled to another network 108. The device 106 may include any type of data processing device including, but not limited to data storage servers, application servers, mainframes, PBXs, or any other type network node. In the context of the present network architecture 100, the first network 104 and the second network 108 may each take any form including, but not limited to a local area network (LAN), a virtual local area network (VLAN), a wide area network (WAN) such as the Internet, etc. The data processing devices 106 may also include desktop computers, laptop computers, hand-held computers, web servers, business transaction servers, printers or any other type of hardware/software. In use, the remote source 102 accesses the devices 106 via a network control device 110, such as a firewall, filtering router, Virtual Private Network (VPN), etc.

The network control device 110 is adapted for isolating the VLAN 108 and the devices 106 from access through the Internet 104 attached thereto. The purpose of the network control device 110 is to allow the VLAN 108 and the devices 106 to be attached to, and thereby access, the Internet 104 without rendering them susceptible to hostile access from the Internet 104. If successful, the network control device 110 allows for the VLAN 108 and the devices 106 to communicate and transact with the Internet 104 without rendering them susceptible to attack or unauthorized inquiry over the Internet 104.

The network control device 110 also may use an application gateway, or proxy system. Such systems operate on the basis of an application, or a computing platform's operating system (OS), monitoring "ports" receiving incoming connection requests. A port is a numerically designated element contained in the overhead of a packet. A port number indicates the nature of a service associated with a packet. When the OS or monitoring application receives a request on a particular port, a connection is opened on that port. A program for managing the connection is then initiated, and the network control device 110 starts a gateway application, or proxy, that validates the connection request.

Network control device 110 typically restricts access based only on address/port/protocol information. Further, network control device 110 may validate communications merely to ensure that requests conform to known standards (e.g. HTTP/1.x). Unfortunately, network control device 110 does not typically examine content of communications for security purposes.

An administrator terminal 140 provides network perimeter security assessment of a gateway according to an embodiment of the present invention. The administrator terminal 140 may be coupled to a gateway 142. The gateway 142 enables data to flow between different networks 150, 154, including across an intermediate network 152, such as the Internet 112. The administrator terminal 140 identifies network gateways in the system and defines their capabilities. Once the network gateways are defined, a network perimeter security assessment according to an embodiment of the present invention is performed by the administrator terminal 140 by performing an analysis that may include a review of the policies, architecture, components, vulnerabilities and applications. The administrator terminal 140 then makes recommendations to secure the network perimeter components 106, 108, 110, 142.

Figure 2:
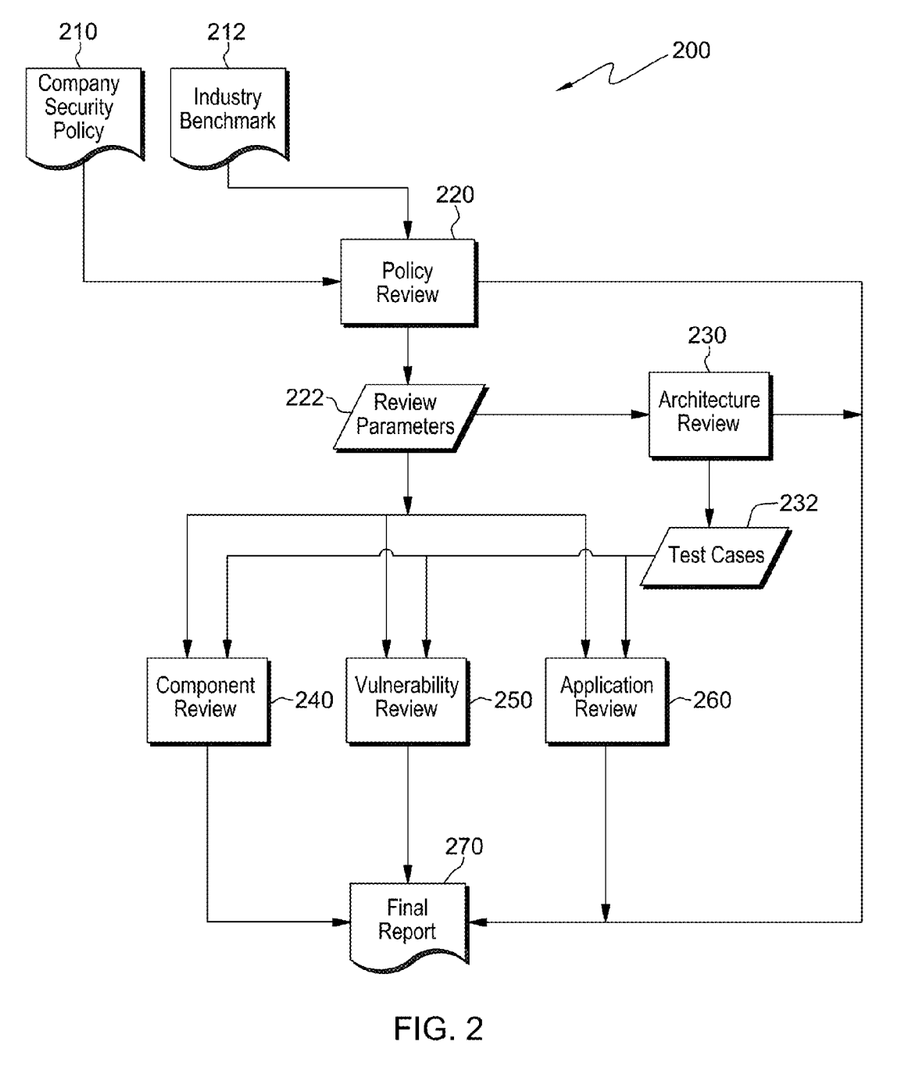
FIG. 2 illustrates a flow chart for performing a network perimeter security assessment according to an embodiment of the present invention.

FIG. 2 illustrates a flow chart 200 for performing a network perimeter security assessment according to an embodiment of the present invention. In FIG. 2, company security policies 210 and industry benchmarks 212 are provided for performing a policy review 220. The policy review 220 identifies any shortcomings of process documentation as well as noncompliance to any retention policies or standards. Review parameters are gathered and provided to other review processes 222. The network architecture review process 230 is performed to determine how network connections are created and specific tests 232 that are used to attempt to circumvent the security controls of the environment during subsequent test plan are identified. The component review process 240 is performed to analyze the components associated with each network connection to determine whether the components comply with corporate policy or an industry benchmark. Vulnerability testing 250 is performed to verify that only authorized services are available and that the latest patches are applied. Tests run to assess the difficulty associated with hacking control points (i.e. firewalls), to identify any other exposures related with the system, and to verify that only authorized services are available and that the latest patches are applied. An application review 260 is performed to identify all necessary data flows and to analyze the authentication, encryption and protocol specifics of the data transfer. The perimeter security assessment processes 220, 230, 240, 250, 260 provide data for generating a final report 270 concerning the security associated with the network perimeter.

Figure 3:
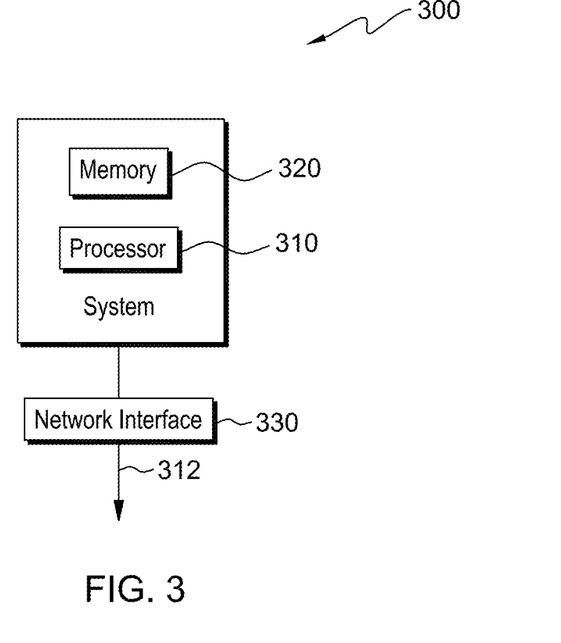
FIG. 3 shows a representative system for providing network perimeter security assessment according to an embodiment of the present invention.

FIG. 3 shows a representative system 300 that may be used for performing network perimeter security assessment according to an embodiment of the present invention. The system 300 in FIG. 3 includes a memory 320 and a processor 310. The system 300 is coupled to a network 312 through a network interface 330. The system uses an operating system, for example, such as the Microsoft Windows® XP, Windows® 2000, Windows NT® or Windows® 9x Operating System (OS), the IBM OS/2® operating system, the MAC OS®, UNIX® operating system or Linux operating system. It will be appreciated that a preferred embodiment may also be implemented on platforms and operating systems other than those mentioned. Embodiments may be written using JAVA™, C, and/or C++ language, or other programming languages, along with an object oriented programming methodology. Object oriented programming (OOP) has become increasingly used to develop complex applications.

Figure 4:
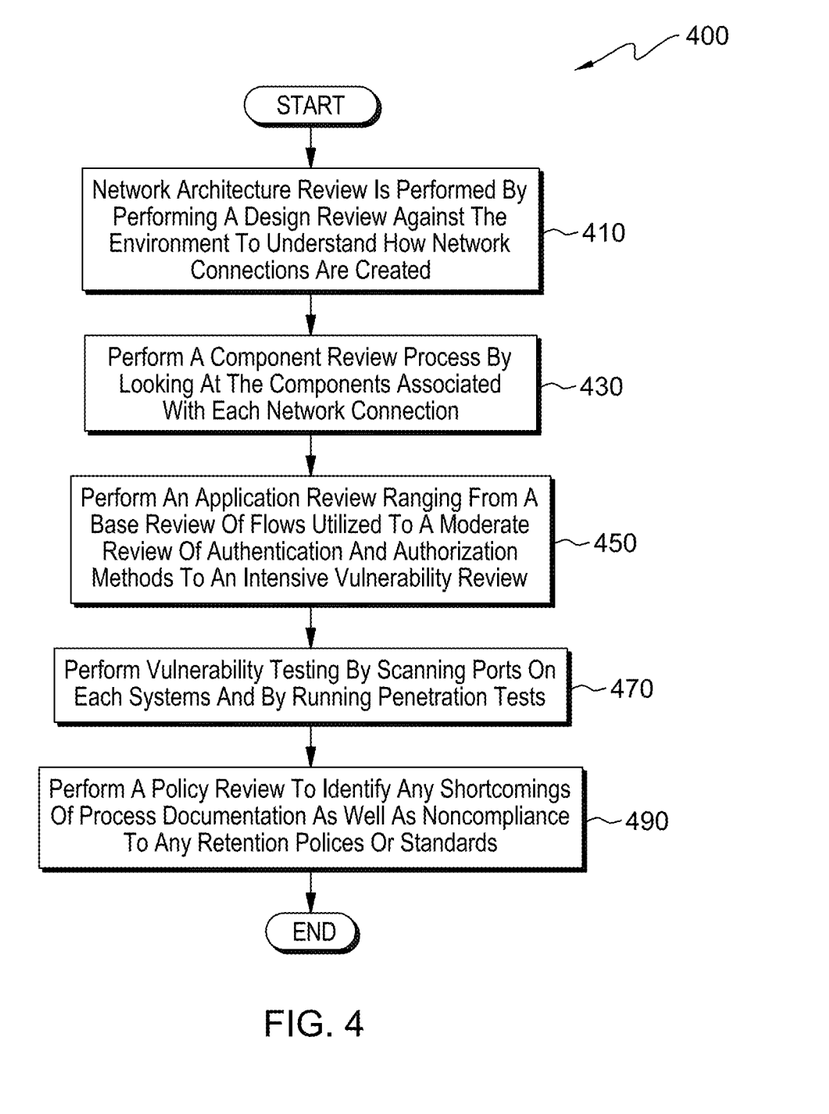
FIG. 4 is a flow chart of the process for performing a security review of a network perimeter according to an embodiment of the present invention.

FIG. 4 is a flow chart 400 of the process for performing a security review of a gateway according to an embodiment of the present invention. Those skilled in the art will recognize that the present invention is not meant to be limited to the order of the perimeter security assessment processes shown in FIG. 4.

According to an embodiment of the present invention as illustrated in FIG. 4, a network security review is performed. The network security review may include a network architecture review. A network architecture review is performed by performing a design review against the environment to understand how network connections are created 410. The network architecture and design are compared against corporate standards and industry best practice benchmarks. The tools and techniques used to authorize and control access to the environment are reviewed. The specific tests used to attempt to circumvent the security controls of the environment during subsequent test plan are identified. The network gateway design is tested to verify whether it can restrict access to the specifically authorized IT resource(s).

The network security review may include a component review process 430. A component review process is performed by looking at the components associated with each network connection. Examples of components are servers, mainframes, VPN devices and firewalls. Each of these components is reviewed for security configurations against corporate policy or an industry benchmark. Control points are special components that control access to a service. A control point, for example, can be a firewall or VPN. The component review process reviews control points for rule analysis and component configuration. An example of a control point is a firewall or VPN device. The systems comprising the business transaction/data transfer are reviewed to ensure that they adhere to applicable corporate standards or, if unavailable, an industry benchmark. The component review process also ensures that the systems provide for protection of the network from probing and attack.

The network security review may also include an application review 450. An application review ranging from a base review of flows utilized to a moderate review of authentication and authorization methods to an intensive vulnerability review may be performed. Network connections invariably have some sort of application providing a service. These applications can be well known, such as SSH, or they can be proprietary. Applications providing authentication and entitlement should be tightened down as securely as possible. The application review process varies depending on the nature of the environment and customer requirements. The application review includes identification of all necessary data flows and an analysis of the authentication, encryption and protocol specifics of the data transfer. This review should verify the methods of authentication and authorization that the application uses, what traffic flows are associated with this application, where the data resides and how it is transported (clear, encryption method and standard).

The network security review may also include a vulnerability review 470. Vulnerability testing is performed by scanning ports on each system and by running penetration tests. The vulnerability testing 470 includes port scans on gateway and non-gateway systems to verify that only authorized services are available and that the latest patches are applied. In addition, penetration tests run to assess the difficulty associated with hacking control points (i.e. firewalls) and identify any other exposures related with the system. Control points are tested with port scans to verify that only authorized services are available and that the latest patches are applied. All systems are tested with port scans (scans include well known services and back doors) to verify that only authorized services are available and latest patches are applied. Control points are also tested by ethical hacking teams to determine exposures related to the system. This is partly automated and partly manual comprehensive scan of all TCP and UDP ports.

The network security review may also include a network policy review 490. A policy review may be performed to identify any shortcomings of process documentation as well as noncompliance to any retention policies or standards. After company policies are collected, a review of process documentation and/or past performance metrics is completed. If no corporate policy is provided, reviews will document shortcomings in relation to industry best practice benchmarks.

Figure 5:
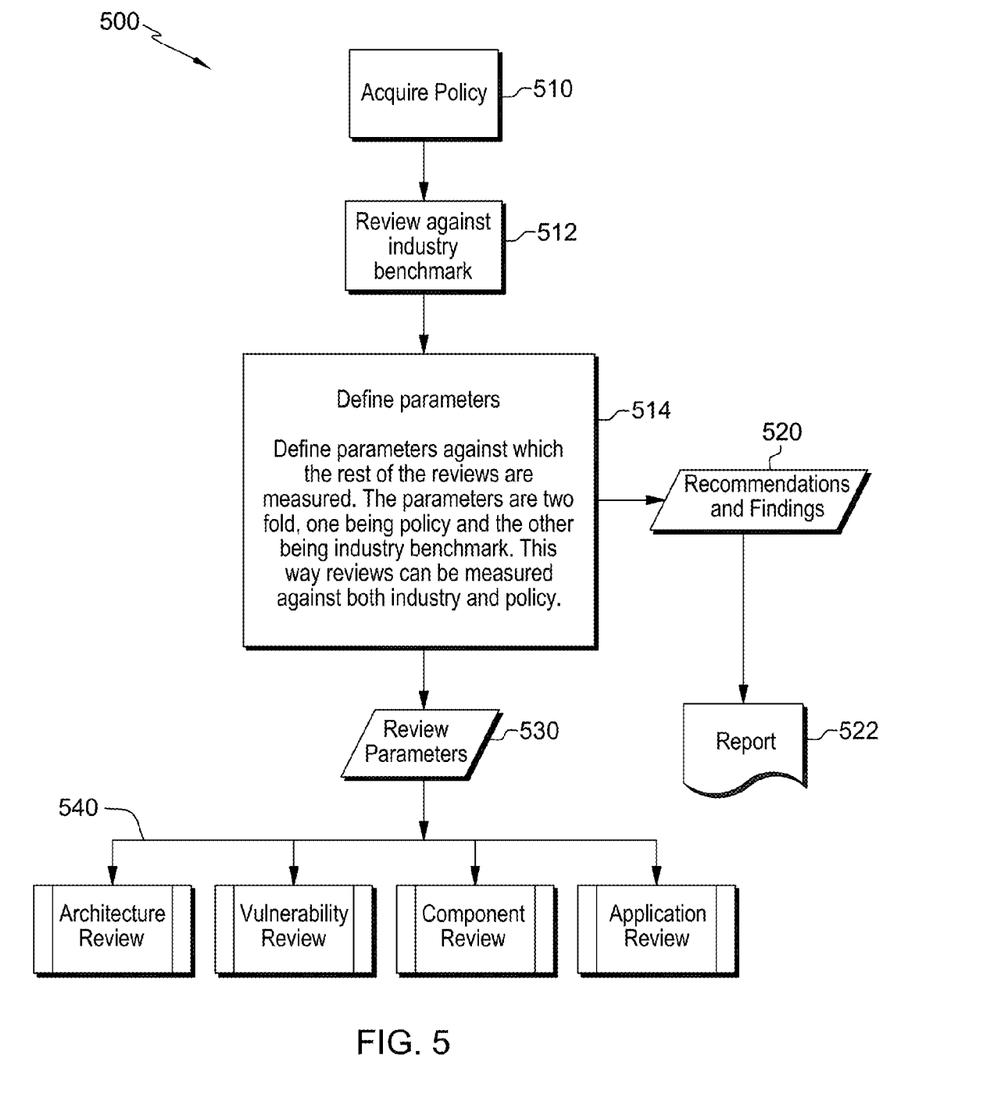
FIG. 5 illustrates an example of the policy review process according to an embodiment of the present invention.

FIG. 5 illustrates an example of the policy review process 490 according to an embodiment of the present invention. In FIG. 5, a policy is provided 510 and then reviewed against benchmarks 512. Parameters against which other reviews should be measured are defined 514. After parameters are defined, recommendations and findings may be provided 520 and a report documenting shortcomings in relation to benchmarks is generated 522. Review parameters are gathered 530 and provided to other review processes 540.

Figure 6:
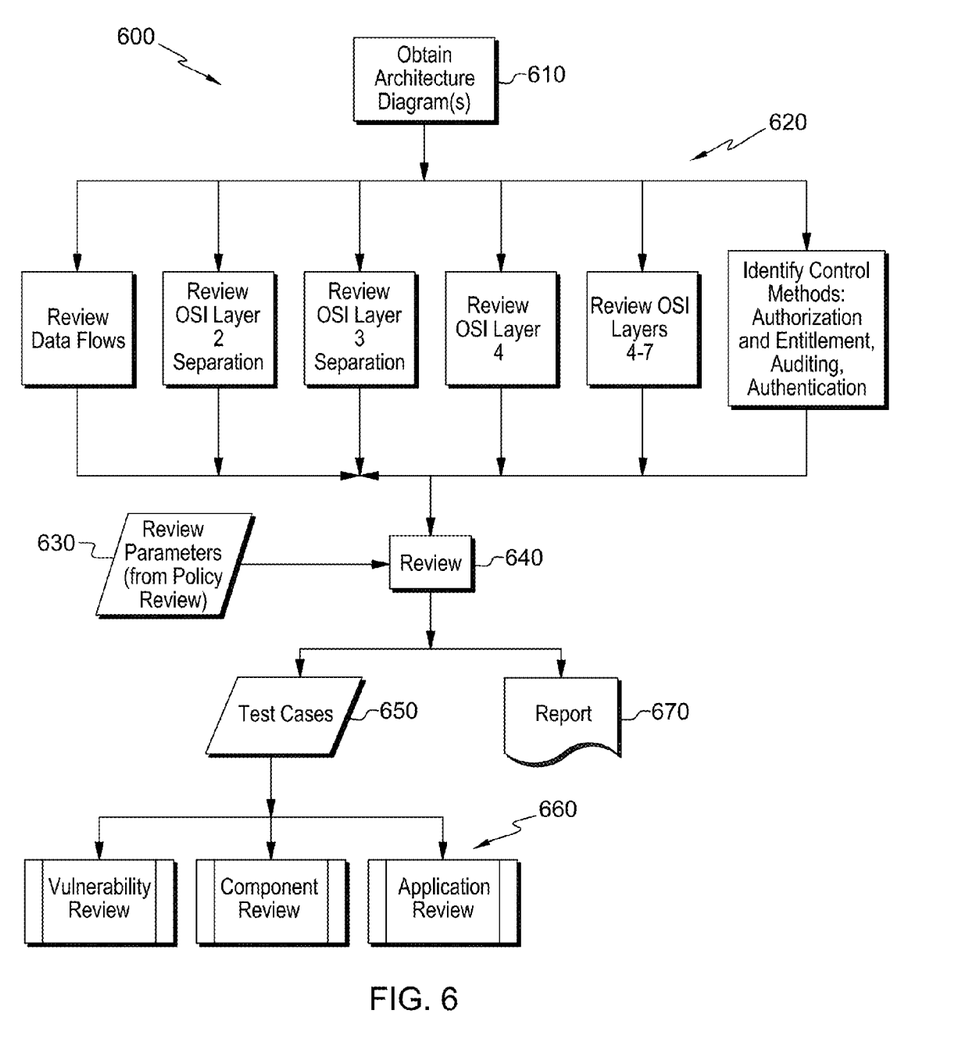
FIG. 6 illustrates a flow chart of the architectural review process according to an embodiment of the present invention.

FIG. 6 illustrates a flow chart of the architectural review process 410 according to an embodiment of the present invention. Architecture diagrams are obtained 610 and different elements of the architecture are reviewed 620. Review parameters 630 are provided to a review process 640, wherein test cases 650 for the other security perimeter review processes 660 and/or an architecture review report 670 is generated.

Figure 7:
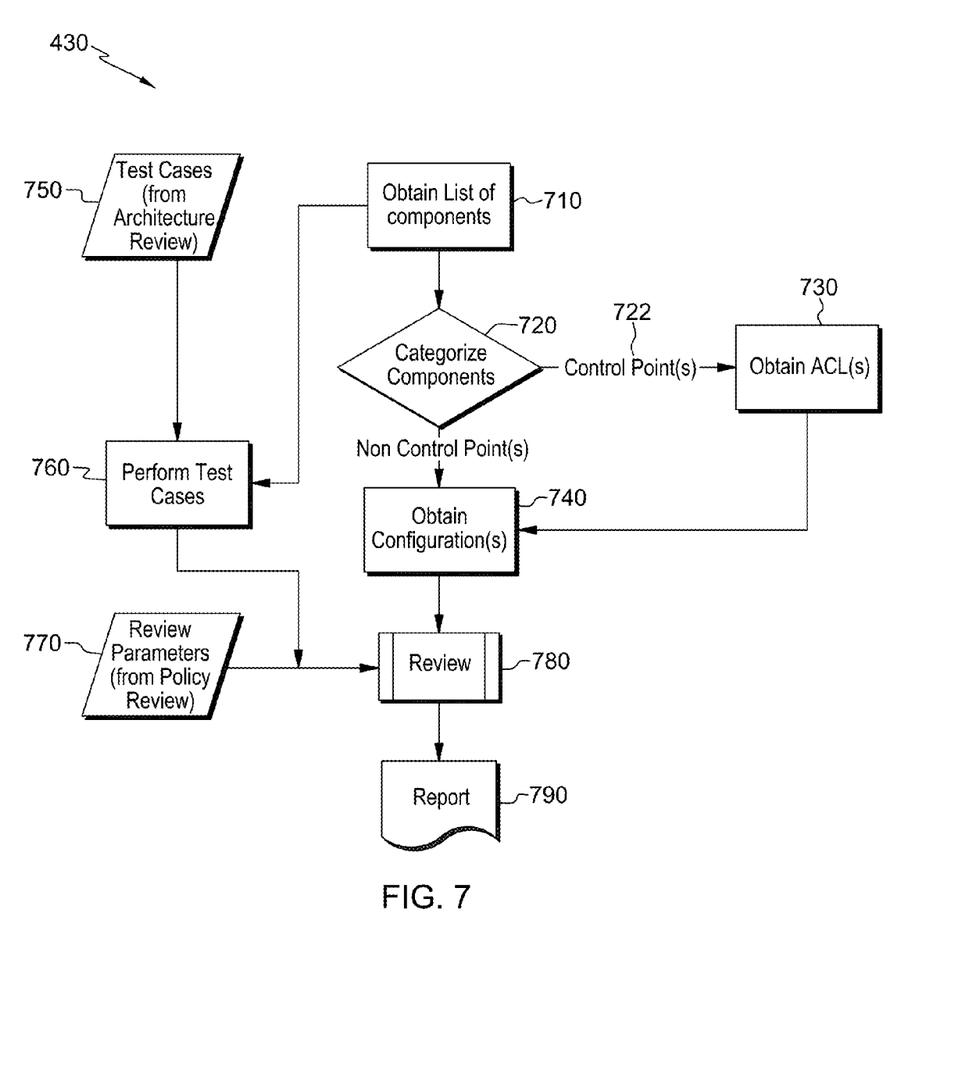
FIG. 7 illustrates a flow chart of the component review process according to an embodiment of the present invention.

FIG. 7 illustrates a flow chart of the component review process 430 according to an embodiment of the present invention. In FIG. 7 a list of the components is obtained 710. The components are categorized 720 as control points or non-control points. For control points 722, the access control list for a component is obtained 730. The component review process reviews control points for rule analysis and component configuration. Configurations are obtained 740. The list of components 710 along with test cases from an architecture review 750 are provided for carrying out tests cases 760. The configurations 740 along with results from the test cases 760 and review parameters 770 provided form the policy review 780 are gathered and reviewed and a component review report is generated 790.

Figure 8:
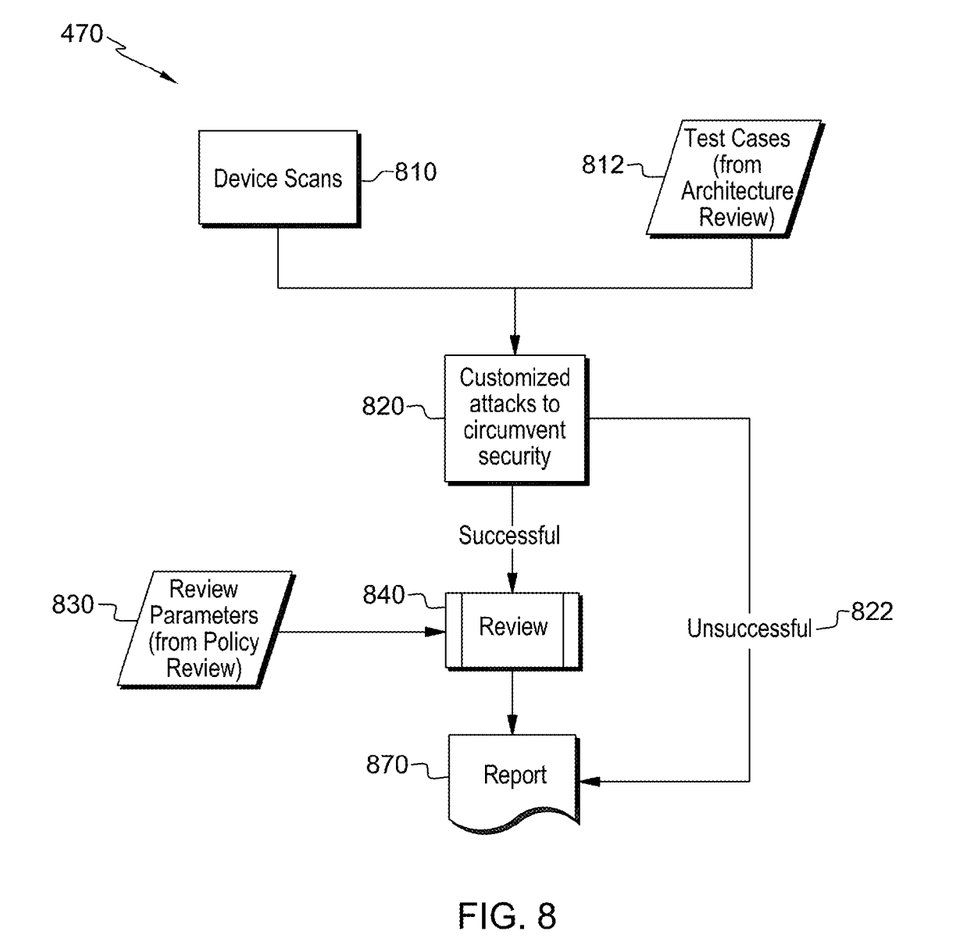
FIG. 8 illustrates a flow chart of the vulnerability review process according to an embodiment of the present invention.

FIG. 8 illustrates a flow chart of the vulnerability review process 470 according to an embodiment of the present invention. Data from device scans 810 and from test cases of the architecture review process 812 are provided to customize attacks to circumvent security 820. If the attacks are not successful 822, a vulnerability review report is generated 870 showing that the attacks were unsuccessful. If the attacks are successful 824, review parameters from the policy review process 830 are used to perform a review of the system 840. A vulnerability review report is generated 870 showing that the attacks were successful.

Figure 9:
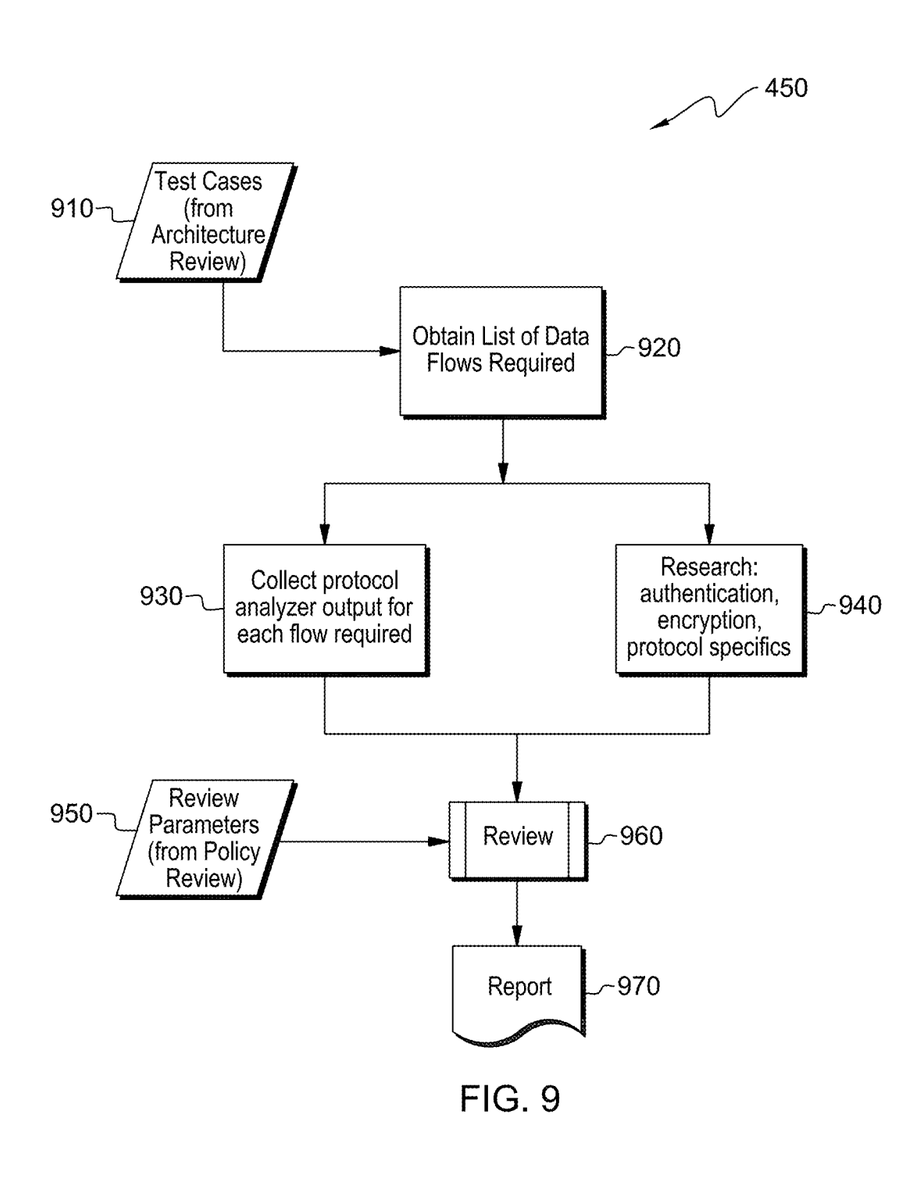
FIG. 9 illustrates a flow chart of the application review process according to an embodiment of the present invention.

FIG. 9 illustrates a flow chart of the application review process 450 according to an embodiment of the present invention. In FIG. 9, data from test cases of the architecture review 910 are used to obtain a list of required data flows 920. Protocol analyzer output for each flow required is collected 930 and authentication, encryption and protocol specifics are researched 940. The results are provided along with review parameters from the policy review 950 are provided for application review 960. An application review report is then generated 970.

Figure 10:
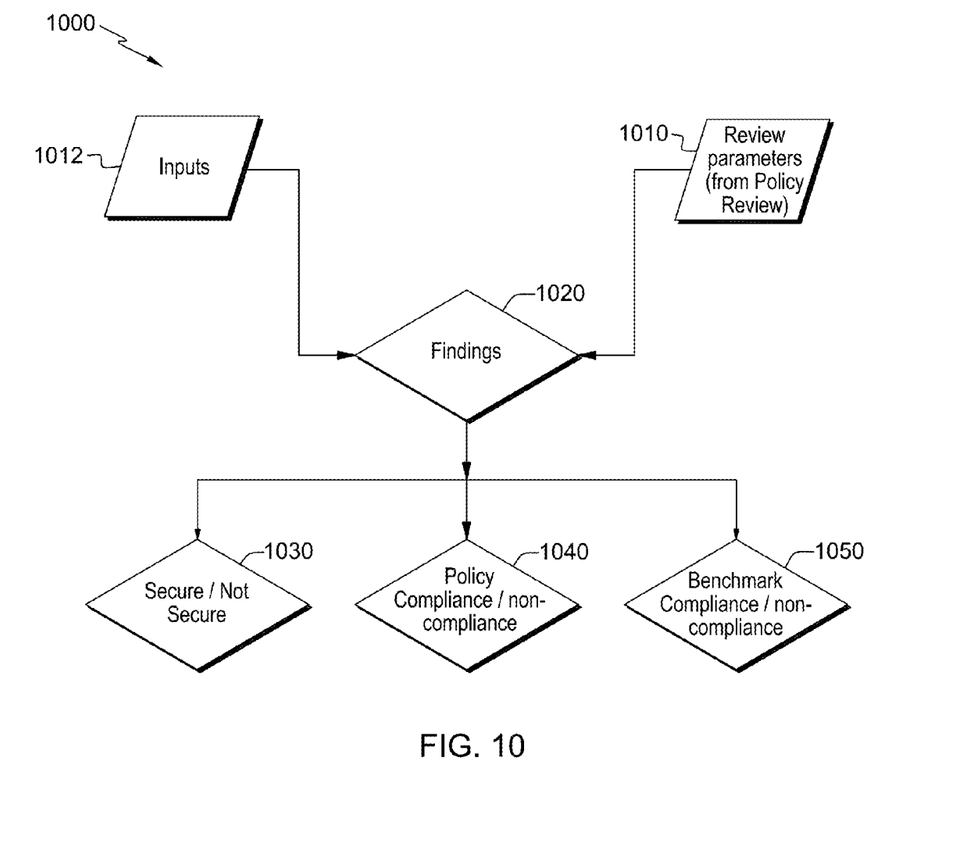
FIG. 10 illustrates a flow chart of a review process according to an embodiment of the present invention that may be used in the perimeter security processes described above.

FIG. 10 illustrates a flow chart of a review process 1000 according to an embodiment of the present invention that may be used in the perimeter security processes described above. In FIG. 10, review parameters from the policy review process 1010 and data input 1012 is provided for analysis to produce perimeter security findings 1020. Based upon the analysis 1020, the findings may include a determination of whether the system is secure or unsecured 1030, whether the system complies with policy 1040, and/or whether the system complies with benchmarks 1050.

Figure 11:
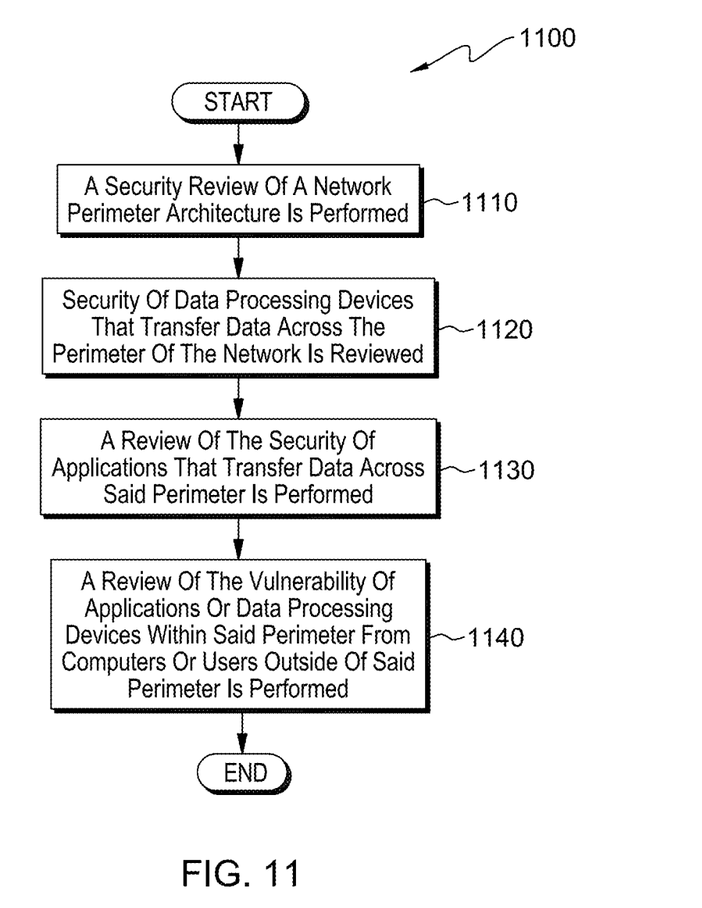
FIG. 11 illustrates a flow chart of the method for providing network perimeter security assessment according to an embodiment of the present invention.

FIG. 11 illustrates a flow chart 1100 of the method for providing network perimeter security assessment according to an embodiment of the present invention. A security review of a network perimeter architecture is performed 1110. This includes at least determining the network perimeter including entries and exits form the network. The security of data processing devices that transfer data across the perimeter of the network is reviewed 1120. The reviewing of the security of data processing devices within said perimeter may include devices that authenticate or authorize computers or users outside of said perimeter that request to access an application within said perimeter. Such data processing devices may include web servers, e-mail servers, FTP servers, data storage servers, application servers, business transaction servers, mainframes, PBXs, desktop computers, laptop computers, hand-held computers, wireless devices, printers or any other type network node. A review of the security of applications that transfer data across said perimeter is also performed 1130. A review of the vulnerability of applications or data processing devices within said perimeter from computers or users outside of said perimeter 1140 is also a part of the network perimeter security assessment. Each of the above reviews may be performed by comparison to a security policy of an enterprise that owns or controls the network.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

The invention claimed is:

1. A method for assessing security of a network perimeter of a network, said method comprising the steps of:

scanning, by one or more hardware processors of a computer system, all Transmission Control Protocol (TCP) and User Datagram Protocol (UDP) ports on a gateway computer at the network perimeter to determine whether an unauthorized application outside the network perimeter and/or at least one unauthorized service from the unauthorized application is available within the network perimeter via the gateway computer;

executing penetration tests on the gateway computer to attempt to exploit a vulnerability of the gateway computer as revealed by the scanning of the ports on the gateway computer; and said one or more hardware processors identifying a first component associated with a first respective connection to the network and determining that the first component complies with a corresponding industry benchmark for security, and identifying a second component associated with a second respective connection to the network and determining that the second component complies with a corresponding security policy of a company associated with the network, said corresponding security policy not being an industry benchmark for security.

2. The method of claim 1, said method further comprising:
said one or more hardware processors reviewing security of an application that transfers data across the network perimeter: (i) based on a location of data transferred by the application and whether the transferred data is encrypted and/or (ii) by analyzing message flows and a protocol used by the application.

3. The method of claim 1, said method further comprising:
said one or more hardware processors testing Open System Interconnection (OSI) Layer 2 separation of the network and OSI Layer 3 separation of the network, and compare results of the tests of OSI Layer 2 separation of the network and OSI Layer 3 separation of the network to (a) a corresponding industry benchmark for security of OSI Layer 2 separation and OSI Layer 3 separation and (b) a corresponding security policy of a company associated with the network, the corresponding security policy for OSI Layer 2 separation for the company and OSI Layer 3 separation for the company not being the industry benchmark for security of OSI Layer 2 separation and OSI Layer 3 separation.

4. The method of claim 1, said method further comprising:
said one or more hardware processors (a) reviewing security of a firewall at the network perimeter by analyzing message flow rules of the firewall, and (b) assessing protection by the firewall against probing into the network perimeter apart from vulnerability to subsequent related attack via the firewall, based in part on message flow rules of the firewall.

5. A computer program product, comprising one or more computer readable hardware storage devices and computer readable program instructions stored on the one or more computer readable hardware storage devices, said program instructions, upon being executed by one or more hardware processors of a computer system, implement a method for assessing security of a network perimeter of a network, said method comprising:

said one or more hardware processors scanning all Transmission Control Protocol (TCP) and User Datagram Protocol (UDP) ports on a gateway computer at the network perimeter to determine whether an unauthorized application outside the network perimeter and/or at least one unauthorized service from the unauthorized application is available within the network perimeter via the gateway computer;

executing penetration tests on the gateway computer to attempt to exploit a vulnerability of the gateway computer as revealed by the scanning of the ports on the gateway computer; and said one or more hardware processors identifying a first component associated with a first respective connection to the network and determining that the first component complies with a corresponding industry benchmark for security, and identifying a second component associated with a second respective connection to the network and determining that the second component complies with a corresponding security policy of a company associated with the network, said corresponding security policy not being an industry benchmark for security.

6. The computer program product of claim 5, said method further comprising:

said one or more hardware processors reviewing security of an application that transfers data across the network perimeter: (i) based on a location of data transferred by the application and whether the transferred data is encrypted and/or (ii) by analyzing message flows and a protocol used by the application.

7. The computer program product of claim 5, said method further comprising:

said one or more hardware processors testing Open System Interconnection (OSI) Layer 2 separation of the network and OSI Layer 3 separation of the network, and compare results of the tests of OSI Layer 2 separation of the network and OSI Layer 3 separation of the network to (a) a corresponding industry benchmark for security of OSI Layer 2 separation and OSI Layer 3 separation and (b) a corresponding security policy of a company associated with the network, the corresponding security policy for OSI Layer 2 separation for the company and OSI Layer 3 separation for the company not being the industry benchmark for security of OSI Layer 2 separation and OSI Layer 3 separation.

8. The computer program product of claim 5, said method further comprising:

said one or more hardware processors (a) reviewing security of a firewall at the network perimeter by analyzing message flow rules of the firewall, and (b) assessing protection by the firewall against probing into the network perimeter apart from vulnerability to subsequent related attack via the firewall, based in part on message flow rules of the firewall.

9. A computer system comprising:
one or more hardware processors;
one or more memories;
one or more computer readable hardware storage devices;
said one or more computer readable hardware storage devices containing program instructions executable by the one or more processors via the one or more memories, to implement a method for assessing security of a network perimeter of a network, said method comprising:

said one or more hardware processors scanning all Transmission Control Protocol (TCP) and User Datagram Protocol (UDP) ports on a gateway computer at the network perimeter to determine whether an unauthorized application outside the network perimeter and/or at least one unauthorized service from the unauthorized application is available within the network perimeter via the gateway computer;

executing penetration tests on the gateway computer to attempt to exploit a vulnerability of the gateway computer as revealed by the scanning of the ports on the gateway computer; and said one or more hardware processors identifying a first component associated with a first respective connection to the network and determining that the first component complies with a corresponding industry benchmark for security, and identifying a second component associated with a second respective connection to the network and determining that the second component complies with a corresponding security policy of a company associated with the network, said corresponding security policy not being an industry benchmark for security.

10. The computer system of claim 9, said method further comprising:

said one or more hardware processors reviewing security of an application that transfers data across the network perimeter: (i) based on a location of data transferred by the application and whether the transferred data is encrypted and/or (ii) by analyzing message flows and a protocol used by the application.

11. The computer system of claim 9, said method further comprising:

said one or more hardware processors testing Open System Interconnection (OSI) Layer 2 separation of the network and OSI Layer 3 separation of the network, and compare results of the tests of OSI Layer 2 separation of the network and OSI Layer 3 separation of the network to (a) a corresponding industry benchmark for security of OSI Layer 2 separation and OSI Layer 3 separation and (b) a corresponding security policy of a company associated with the network, the corresponding security policy for OSI Layer 2 separation for the company and OSI Layer 3 separation for the company not being the industry benchmark for security of OSI Layer 2 separation and OSI Layer 3 separation.

12. The computer system of claim 9, said method further comprising:

said one or more hardware processors (a) reviewing security of a firewall at the network perimeter by analyzing message flow rules of the firewall, and (b) assessing protection by the firewall against probing into the network perimeter apart from vulnerability to subsequent related attack via the firewall, based in part on message flow rules of the firewall.

* * * * *